(12) United States Patent
Adler et al.

(10) Patent No.: US 9,003,270 B2
(45) Date of Patent: Apr. 7, 2015

(54) METHODS AND APPARATUS FOR TEMPORARILY STORING PARITY INFORMATION FOR DATA STORED IN A STORAGE DEVICE

(71) Applicant: Marvell World Trade Ltd., St. Michael (BB)

(72) Inventors: Jason Adler, Fremont, CA (US); Man Cheung, San Jose, CA (US)

(73) Assignee: Marvell World Trade Ltd., St. Michael (BB)

(*) Notice: Subject to any disclaimer, the term of this patent is extended or adjusted under 35 U.S.C. 154(b) by 148 days.

(21) Appl. No.: 13/894,776

(22) Filed: May 15, 2013

(65) Prior Publication Data
US 2013/0326317 A1    Dec. 5, 2013

Related U.S. Application Data

(60) Provisional application No. 61/655,166, filed on Jun. 4, 2012.

(51) Int. Cl.
*G06F 11/00* (2006.01)
*G06F 11/10* (2006.01)

(52) U.S. Cl.
CPC ............ *G06F 11/10* (2013.01); *G06F 11/1032* (2013.01); *G06F 2211/1035* (2013.01); *G06F 11/108* (2013.01); *G06F 11/1004* (2013.01)

(58) Field of Classification Search
CPC .... G06F 11/1004; G06F 11/10; G06F 11/108; G06F 2211/1035; G06F 11/1032
See application file for complete search history.

(56) References Cited

U.S. PATENT DOCUMENTS

| | | | |
|---|---|---|---|
| 6,446,237 B1* | 9/2002 | Menon | 714/800 |
| 2006/0200697 A1* | 9/2006 | Ito | 714/6 |
| 2009/0113235 A1* | 4/2009 | Selinger | 714/6 |
| 2013/0031300 A1* | 1/2013 | Seo et al. | 711/103 |
| 2013/0290629 A1* | 10/2013 | Uehara et al. | 711/114 |

* cited by examiner

*Primary Examiner* — John P Trimmings (57) ABSTRACT

Methods and apparatus for temporarily storing parity information for data stored in a storage device are provided. A first data block and parity information associated with the first data block are received. The first data block is stored in a first region of the storage device. The parity information is stored until a second data block is successfully stored in a second region of the storage device. The first region of the storage device is associated with the second region of the storage device.

20 Claims, 5 Drawing Sheets

METHODS AND APPARATUS FOR TEMPORARILY STORING PARITY INFORMATION FOR DATA STORED IN A STORAGE DEVICE

CROSS REFERENCE TO RELATED APPLICATION

This disclosure claims the benefit of U.S. Provisional Application No. 61/655,166, filed Jun. 4, 2012, which is incorporated herein by reference.

FIELD OF USE

The present disclosure relates generally to solid state storage device systems and methods, and more particularly, to efficiently storing parity information for data stored in a solid state storage device.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, is neither expressly nor impliedly admitted as prior art against the present disclosure.

Traditional sold-state devices (e.g., NAND storage devices) employ error correction code (ECC) fields that are stored with the user data to correct bit errors that may occur when the user data is read back. The NAND storage devices are divided into multiple stripes which store multiple pages of user data per stripe. Because these ECC fields are not strong enough to correct the number of bit errors in a page of user data, a separate page of data is stored within a given stripe to hold parity data. The stored parity data protects any page within the stripe of pages. Although, such data protection ensures reliability in the stored data, the amount of storage consumed by the parity data reduces the available storage space for user data. Another disadvantage of the traditional data protection system is the degradation in user performance due to the reduction in number of pages with user data that can be transferred in parallel.

SUMMARY

In accordance with the principles of the present disclosure, methods and apparatus are provided for temporarily storing parity information for data stored in a storage device, and, more particularly, to efficiently storing parity information for data stored in a non-volatile storage device.

In some embodiments, a first data block and parity information associated with the first data block are received. The first data block may be stored in a first region of the storage device. The parity information may be stored until a second data block is successfully stored in a second region of the storage device. The first region of the storage device may he associated with the second region of the storage device.

In some implementations, the storage device may be a non-volatile storage device and the parity information may be stored in a volatile storage device. In some implementations, the first region may be identified as being associated with the second region by determining that, when an error is encountered storing data in the second region, data stored in the first region is subject to errors.

In some implementations, each of the first and second regions may correspond to a respective stripe of a plurality of stripes of the storage device in which data is stored. In some implementations, the parity information may be stored in a region of the storage device dedicated to store parity information for some but not all of the plurality of stripes of the storage device.

BRIEF DESCRIPTION OF THE DRAWINGS

The details of one or more implementations are set forth in he accompanying drawings are the description below. Other features and various advantages will be more apparent upon consideration of the following detailed description, taken in conjunction with the accompanying drawings in which.

DETAILED DESCRIPTION

This disclosure generally relates to temporarily storing parity information for data stored in a storage device, and, more particularly, to efficiently storing party information for data stored in a non-volatile storage device. For illustrative purposes, this disclosure is described in the context of a solid state storage device (e.g., a flash storage device or a NAND based storage device) used to store user data and a volatile storage device (e.g., RAM) used to temporarily store parity information for the user data. It should be understood, however, that this disclosure is applicable to any other type of non-volatile storage device (e.g., magnetic storage device, ROM, PROM, EPROM, EEPROM, nvSRAM, FeRAM, MRAM, PRAM, CBRAM, SONGS, RRAM, NRAM, Millipede memory, or holographic storage device) and volatile storage device (DRAM, SDRAM, SRAM, T-RAM, Z-RAM, or TTRAM) combination.

Figure 1:
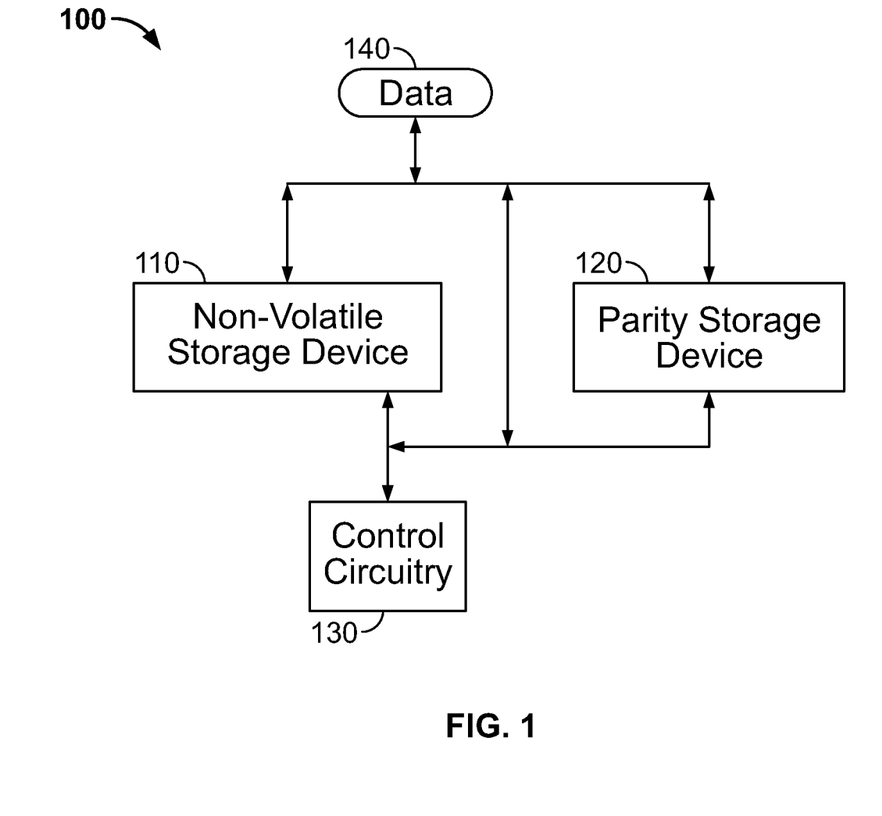
FIG. 1 is a diagram of an illustrative storage device system in accordance with an embodiment of the present disclosure.

FIG. 1 is a diagram of storage device system 100 in accordance with an embodiment of the present disclosure. System 100 includes data 140, a non-volatile storage device 110, a parity storage device 120 and control circuitry 130. Data 140 may include a data bus, a receiver, and/or any other circuitry that can convey data signals to another component in system 100. Data 140 may include user data and/or parity information.

A portion of data 140 may be generated by another component of system 100. For example, another component in system 100 (e.g., control circuitry 130) may receive user data from an external component (e.g., a CPU) and generate parity information for the user data. In some implementations, the user data may include 64 pages of data and the generated party information may include one page of data that may be used to recover any one of the 64 pages of user data. This results in a data stripe being a total of 65 pages in size. In some implementations, if an attempt to read any of the 64 user pages results in too many bit errors for the FCC to correct, control circuitry 130 may process the other 63 user paces and the corresponding parity page and combine them to reproduce the unreadable user page. In the case of a stripe being 65 pages long, control circuitry 130 may recover up to one page with errors per stripe.

Although non-volatile storage device 110 is drawn separately from parity storage device 120, non-volatile storage device 110 and parity storage device 120 may be incorporated into the same physical component. For example, parity storage device 120 may be a dedicated storage region of non-volatile storage device 110. Alternatively, non-volatile storage device 110 and parity storage device 120 may be separate different physical components. Alternatively, non-volatile storage device 110 and party storage device 110 may be separate devices on the same physical component. For example, non-volatile storage device 110 may be a solid-state storage device of one type and parity storage device 120 may be a solid-state storage device of another type (e.g., a volatile or non-volatile storage device). Storage device 120 may be smaller than storage device 110. For example, storage device 120 may have a capacity to store parity information for less than all of the user data stored in storage device 110. Specifically, storage device 120 may have a capacity or may be dedicated to only storing parity information for two or four stripes of user data stored in device 110.

In some embodiments, control circuitry 130 stores data to non-volatile storage device 110 in sequential regions of non-volatile storage device 110. For example, control circuitry 130 stores data to a first region that is adjacent to a second region before storing the data to the second region. Control circuitry 130 temporarily stores parity information for data stored in a given region of non-volatile storage device 110 until data is successfully stored in another region associated with the region in which data was stored. The associated region may be adjacent or non-adjacent to the region in which data was previously stored. Temporary storage of parity information may include deletion of the parity information after a given period of time or when a specified condition is satisfied. Temporary storage of parity information may include overwriting the stored party information with other information (e.g., parity information for another block, of data) after a given period of time or when a specified condition is satisfied. The specified condition may be the successful storage of data to a region of the device that is associated with the region corresponding to the parity information. In some implementations, the specified condition may be the successful storage of data to a region of the device that is adjacent to the region of the storage device that is associated with the region corresponding to the parity information. In particular, successful storage of the data in a second region may indicate that the parity information corresponding to a first region associated with the second region is allowed to be deleted or removed. However, unsuccessful storage of the data in the second region may indicate that the parity information corresponding to the first region is not allowed to be deleted or removed. Temporary storage of parity information may include storage of the parity information in a device which is subject to deletion when power is removed from the device (e.g., a RAM storage device).

Control circuitry 130 receives a first block of data 140 and generates the parity information for the first block of data 140. Control circuitry 130 may receive a second block of data 140 and generate the parity information for the second block, of data 140. Control circuitry 130 may store the first block of data 140 to a first region of storage device 110 and the second block of data 140 to a second region of storage device 110. Control circuitry 130 may temporarily store the parity information for the first block of data 140 and for the second block of data 140 in parity storage device 120. In some implementations, control circuitry 130 may store the first and second blocks of data 140 in parallel (simultaneously) or sequentially (one after the other).

Control circuitry 130 may identify regions (e.g., stripes) of non-volatile storage device 110 that are associated with each other. For example, control circuitry 130 may cross-reference a look-up table to determine which regions (e.g., stripes) of storage device 110 are associated with each other. In some implementations, a first region may be associated with a second region because errors that are generated in the first region may cause errors to be generated in the second region (e.g., during a write or program operation). In some implementations, a first region may be associated with a second region because errors that are generated in the second region may cause errors to be generated in the first region (e.g., during a write or program operation). In some implementations, a first region may be associated with a second region because the first region may be within a given pre-determined physical proximity of the second region (e.g., less than two stripes away or less than two stripes are between the first region and the second region). Such regions may be referred to as regions that are vulnerable to program disturb errors or write disturb errors from other regions. As referred to throughout this disclosure, the phrases "first region" and "second region" do not imply any order in which the data is written/read to/from the given region. Specifically, data may be written to the second region before being written to the first region and may thereby cause errors in the first region. Alternatively, data may be written to the first region before being written to the second region and may thereby cause errors in the second region.

After control circuitry 130 receives a third block of data 140 and generates parity information for the third block of data 140, control circuitry 130 may identify in what region of storage device 110 the third block of data 140 will be stored. Control circuitry 130 may determine whether the identified region (e.g., a third region) is associated with a region of storage device 110 in which user data has been stored. For example, control circuitry 130 may determine that the third region is associated with the first region of storage device 110. In response to determining that the third region is associated with the first region, control circuitry 130 may determine whether parity information is stored in parity storage device 120 for the data stored in the first region. Control circuitry 130 may not delete or overwrite the parity information stored in storage device 120 for the data stored in the first region until the third block of data is successfully stored in the third region.

After storing the third block of data 140 in the third region of storage device 110, control circuitry 130 may determine whether the third block of data 140 was stored without encountering any errors (e.g., successfully stored). In response to determining that the third block, of data 140 was stored without encountering any errors, control circuitry 130 may delete or remove the parity information stored in storage device 120 for the data stored in the first region and store, in place of the removed parity information, parity information for the data stored in the third region of storage device 110. In some embodiments, in response to determining that the third block of data 140 was stored without encountering any errors, control circuitry 130 may delete or remove the parity information stored in storage device 120 for the data stored in the first region after data is stored in a region adjacent to the third region (e.g., a fourth region). In such circumstances, the parity information for two associated regions may be stored on device 120 at a given time e.g., until data is stored in a region adjacent to one of the associated regions). Control circuitry 130 may store, in place of the removed parity information, parity information for the data stored in the fourth region of storage device 110.

In response to determining that the third block of data 140 encountered errors during storage, control circuitry 130 may retrieve the parity information stored in storage device 120 for the data stored in the first region and identify which portion of the data stored in the first region may have been affected by the errors encountered in the third block of data 140 (e.g., the third page stored in the first region may have been affected). Control circuitry 130 may recover or correct the affected portion (e.g., the third page) using the retrieved parity information and may store the recovered page to another region of storage device 110. In some implementations, control circuitry 130 may move the entire data block, stored in the first region that had a portion affected by the write disturb errors or program disturb errors to another region of storage device 110 after recovering or correcting the affected portion using the parity information.

By retaining parity information for data stored in a first region of storage device 110 until data is stored in a third region of storage device 110, control circuitry 130 ensures that the data stored in the first region is protected from write disturb or program disturb errors. Specifically, after data is successfully stored to the third region of storage device 110, data stored in the first region that is associated with the third region is no longer subject to write disturb or program disturb errors and therefore does not require the parity information for the data stored in the first region. Accordingly, storage space occupied by the parity information for the data stored in the first region can be made available for parity information associated with data stored in another region that is subject to write disturb or program disturb errors (e.g., the third region).

Figure 2:
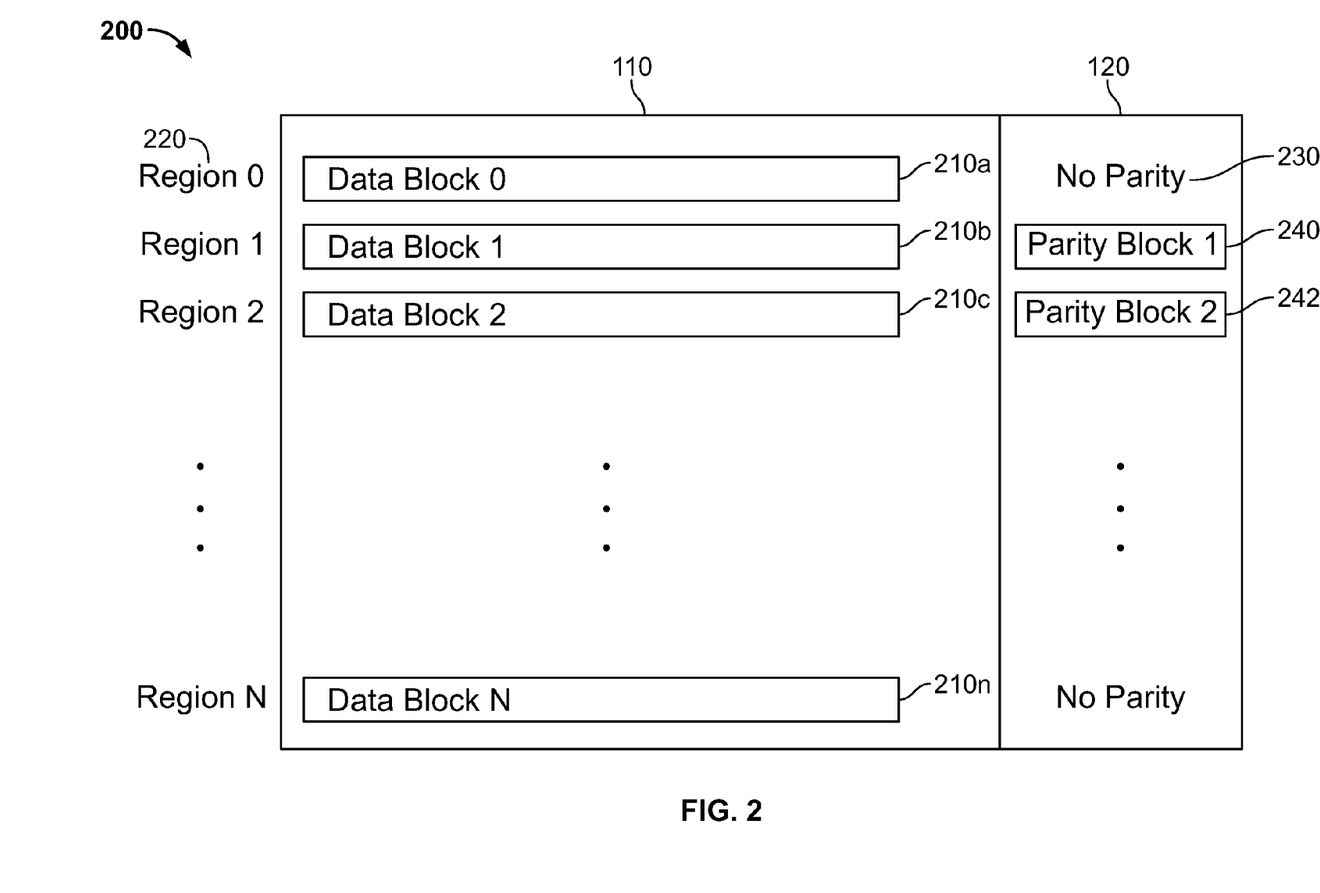
FIGS. 2, 3A and 3B are diagrams of illustrative temporary storage of parity information in a storage device system in accordance with an embodiment of the present disclosure.

FIG. 2 is a diagram 200 of an illustrative temporary storage of parity information in a storage device system in accordance with an embodiment of the present disclosure. Diagram 200 includes an illustrative arrangement of storage regions 220 of non-volatile storage device 110 and an illustrative arrangement of parity information stored in parity storage device 120.

Each of regions 220 may correspond to a different stripe for storing data in device 110. As shown, region 0 is adjacent to region 1 which is adjacent to region 2. In some implementations, each of regions 220 may store up to 64 pages of data. Specifically, each of the data blocks 210*a-n* (e.g., a first data block 210*a*, a second data block 210*b*, a third data block 210*c*) may include a plurality of pages of data (e.g., 64 pages of data). In sonic implementations, each of data blocks 210*a-n* stores a different amount of pages (e.g., one block may store 63 pages of data while another stores 64 pages of data). In some implementations, each of data blocks 220*a-n* stores the same amount of pages (e.g., one block may store 64 pages of data and another stores 64 pages of data).

In some embodiments, parity information stored in parity storage device 120 for a given one of regions 220 may be only stored temporarily until data is successfully stored in another one of regions 220 that is associated with the region in which data is stored. In particular, region 0 may be associated with region 2 and since data block 220*c* has been successfully stored in region 2, the parity information 230 that was stored for the data stored in region 0 (e.g., data block 210*a*) may be removed or overwritten. For example, parity information 230 may be replaced with parity block 242 that corresponds to data block 210*c* stored in region 2. In some implementations, only two or four parity blocks 240 and 242 may be stored at any given time in storage device 120 for data 210*a-n* stored in device 110.

Figure 3A:
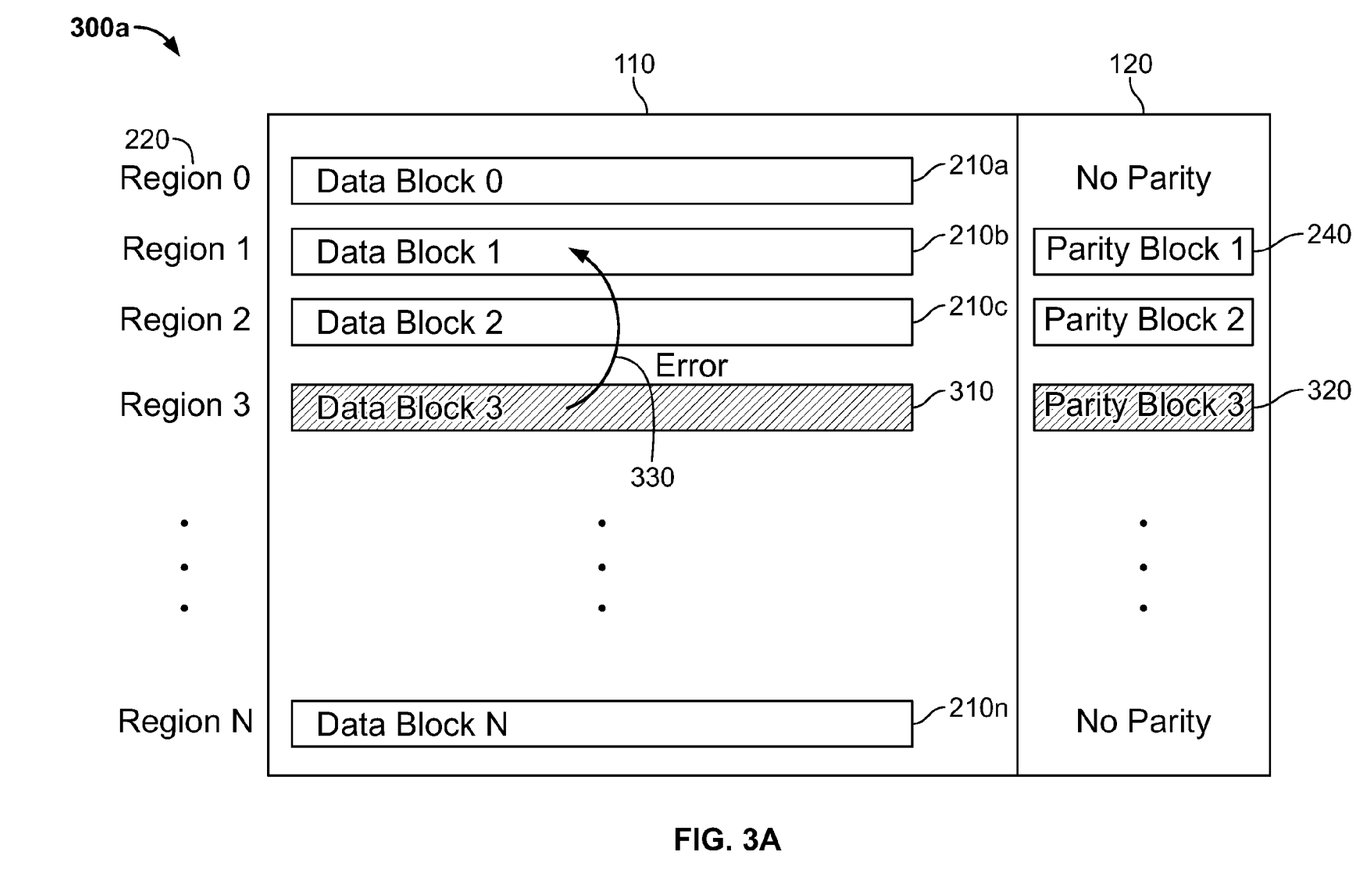
Figure 3B:
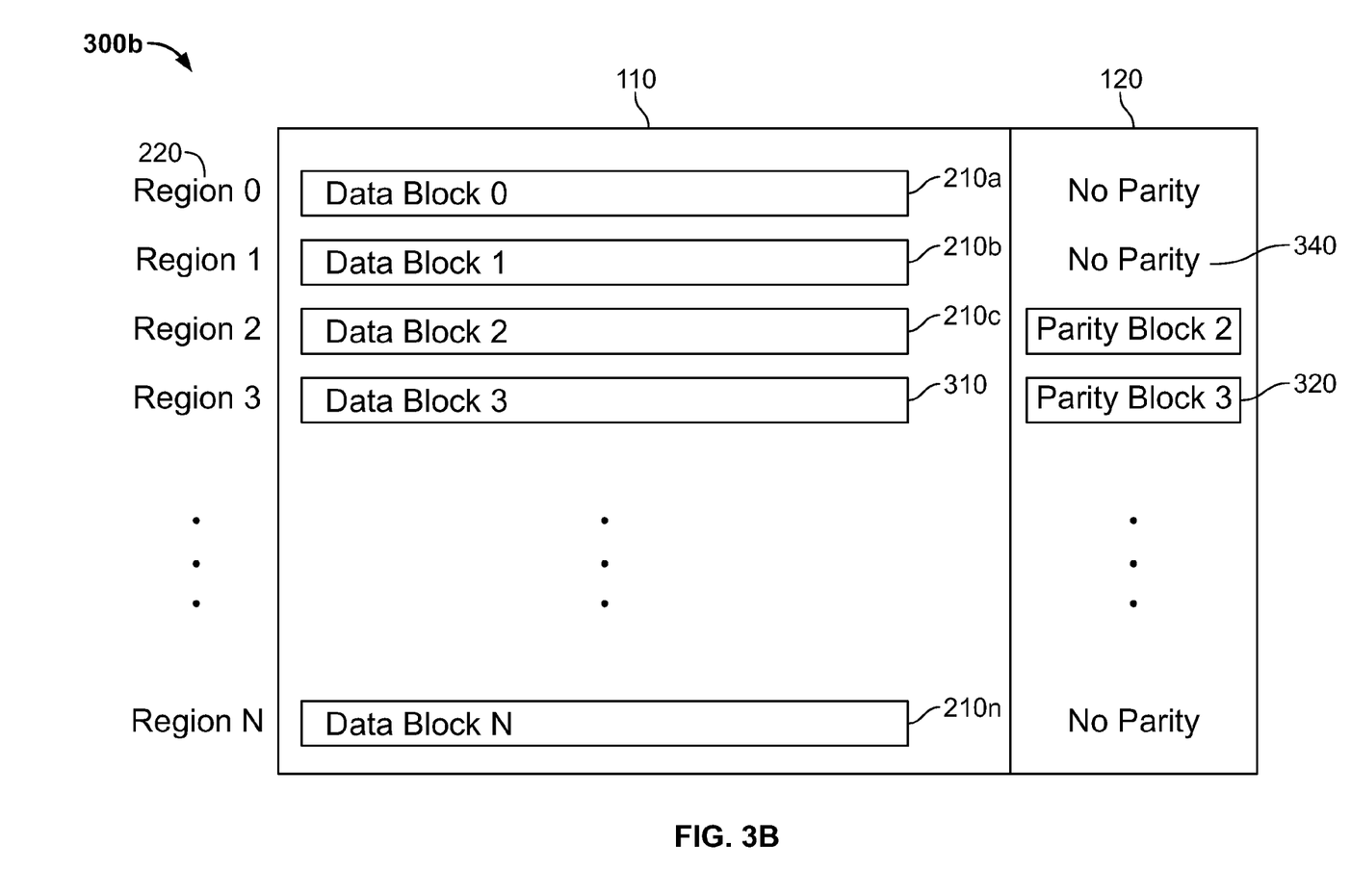

FIGS. 3A-B are diagrams of an illustrative temporary storage of parity information in a storage device system in accordance with an embodiment of the present disclosure. Diagram 300*a* of FIG. 3A shows an embodiment in which data attempted to be stored in a region of storage device 110 is stored unsuccessfully (e.g., includes a write or program error) which causes a write disturb or program disturb error in another region of device 110 associated with the region in which the data storage was attempted. Diagram 300*b* of FIG. 3B shows an embodiment in which data attempted to be stored in a region of storage device 110 is stored successfully (e.g., does not include a write or program error) and thereby parity information, temporarily stored for another region associated with the region in which the data storage was attempted, may be removed or overwritten.

In some embodiments, control circuitry 130 may receive a block of data 140 and may compute parity information 320 for the block of data 140. Control circuitry 130 may determine that the next region 220 in which to store the received block of data 140 is region 3 of storage device 110. Control circuitry 130 may determine which region is associated with region 3 (e.g., by referencing a look-up table of associated regions). For example, control circuitry 130 may determine that region 1 is associated with region 3. Control circuitry 130 may also determine that parity block 240 stored in device 120 corresponds to data block 210*b* stored in region 1.

Control circuitry 130 may store the received block of data 140 in region 3 as data block 310. After or while storing the data in region 3, control circuitry 130 may determine whether the data was successfully stored in region 3. Specifically, control circuitry 130 may determine whether any writing or programming errors have been encountered in data block 310. For example, control circuitry 130 may determine that a portion of data block 310 includes an error (e.g., page 3 of data block 3 includes a write error).

As shown in 300*a* (FIG. 3A), in response to determining that the data was not successfully stored in region 3, control circuitry 130 may identify that region 1 is associated with region 3 in which the data with the error 330 was being stored and that region 1 may therefore have a portion of data that is negatively affected by the error encountered in region 3. Accordingly, control circuitry 130 may prevent parity block 240 from being deleted until error 330 is corrected in the affected portion of data block 210*b*. Specifically, control circuitry 130 may retrieve parity block 240 and a portion or all of data block 210*b*. Control circuitry 130 may process the retrieved party information from block 240 with the retrieved data from data block 210*b* and correct the error in the portion of data block 210*b*. Control circuitry 130 may store the corrected data back to region 1 or another region of device 110.

As shown in 300*b* (FIG. 3B), in response to determining that the data was successfully stored in region 3, control circuitry 130 may identify that region 1 is associated with region 3 in which the data was being stored and that the data in region 1 may thus no longer be negatively affected by the storage of data in associated region 3. For example, control circuitry 130 may determine that region 1 is no longer subject to write disturb or program disturb errors from another region region 3). Accordingly, control circuitry 130 may delete or remove parity block 340 from storage 120 and store parity block 320, corresponding to data block 310 stored in region 3, in place of data block 240. Alternatively, control circuitry 130 may store parity block 320 corresponding to data block 310 stored in region 3 in device 120 and overwrite parity block 340 with parity information for regions subsequent to region 3 in sequence of regions 220 when data is stored in those subsequent regions. In particular, device 120 may, at any given time, store parity information for one or more data blocks 210 that were most recently stored and parity information for data being written that is subject to program or write errors.

For example, in some implementations control circuitry 130 may store data block 310 at the same time as the corresponding parity information. In some implementations, control circuitry 130 may store parity information corresponding to data block 310 after determining whether the data block was successfully stored. In the case that the parity information is stored after determining whether data block 310 was successfully stored, control circuitry 130 may overwrite parity block 240 that corresponds to a region that is associated with the region in which the data is being stored. However, in the case that parity information is stored at the same time as data block 310 is being stored in region 3, control circuitry 130 may not overwrite the parity block 240 that corresponds to region 1 that is region 3 in which the data is being stored until data is stored in another region (e.g., region 4) which is not associated with region 1.

In some embodiments, data blocks may be stored in pairs in storage device 110. For example, data blocks 210b and 210c may be stored together or at the same time in regions 1 and 2 of device 110. Along with the data block pairs, parity information for these data blocks may also be stored in pairs. However, the parity blocks storing the party information for the data pairs may be deleted or overwritten independently of each other. For example, parity block 240 may be deleted or overwritten before parity block 242. Specifically, when an adjacent pair of data blocks is stored in regions 3 and 4 and only the data from region 3 includes an error, control circuitry 130 may determine that the region associated with region 3 is region 1 only, not region 2. Accordingly, control circuitry 130 may recover only the data from region 1 using the parity information corresponding to the data stored in region 1 independently of region 2. Similarly, when an adjacent pair of data blocks is stored in regions 3 and 4 and these data blocks are successfully stored without errors, control circuitry 130 may allow parity information in parity block 240 associated with region 1 to be deleted or removed first before allowing parity information in parity block 242 associated with region 2 to be deleted.

Figure 4:
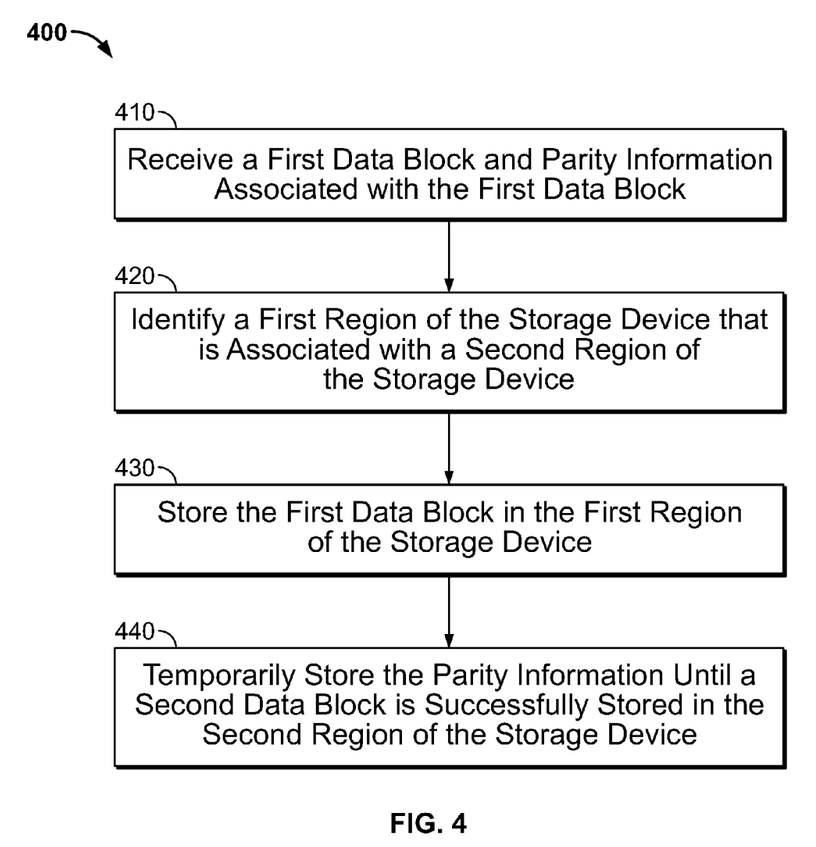
FIG. 4 illustrates a process for temporarily storing parity information in accordance with an embodiment of the present disclosure.

FIG. 4 illustrates a process 400 for temporarily storing parity information in accordance with an embodiment of the present disclosure. At 410, a first data block and parity information associated with the first data block are received. For example, control circuitry 130 may receive data 140 and generate parity information for the received data 140 (FIG. 1).

At 420, a first region of the storage device that is associated with a second region of the storage device is identified. For example, control circuitry 130 may identify region 1 of storage device 110 as being associated with region 3 of storage device 110 (FIG. 2).

At 430, the first data block is stored in the first region of the storage device. For example, control circuitry 130 may store data block 210b in region 1 of storage device 110.

At 440, the parity information is temporarily stored until a second data block is successfully stored in the second region of the storage device. For example, control circuitry 130 may temporarily store the generated parity information corresponding to data block 210b in parity block 240 of storage device 120. The parity information stored in parity block 240 may be deleted or overwritten after data block 310 is successfully stored in region 3 that is associated with region 1. In some implementations, the parity information is deleted or overwritten when data is written or stored in a region that follows region 3 (e.g., region 4 of device 110) or after a predetermined period of time. In such cases, parity blocks corresponding to the most recently stored data (e.g., data in regions 3 and 4) and parity blocks corresponding to data stored immediately prior to the most recently stored data (e.g., data stored in regions 1 and 2) may be stored at any given time in device 120. The data that was stored immediately prior to the most recently stored data may be stored in one or more regions that are adjacent to and precede the regions in which data was most recently stored. In some implementations, the parity information corresponding to region 1 (that is associated with region 3 in which data has been most recently stored) is deleted or overwritten with party information corresponding to data block 310 stored in region 3.

The foregoing describes methods and apparatus for temporarily storing parity information for data stored in a storage device (e.g., non-volatile, storage device). The above-described embodiments of the present disclosure are presented for the purposes of illustration and not of limitation. Furthermore, the present disclosure is not limited to a particular implementation. For example, one or more steps of methods described above may be performed in a different order (or concurrently) and still achieve desirable results. In addition, the disclosure may be implemented in hardware, such as on an application-specific integrated circuit (ASIC) or on a field-programmable gate array (FPGA). The disclosure may also be implemented in software.

What is claimed is:

1. A method for storing data in a storage device, the method comprising:
    receiving a first data block and parity information associated with the first data block;
    storing the first data block in a first region of the storage device; and
    storing the parity information until a second data block is successfully stored in a second region of the storage device, wherein the first region of the storage device is associated with the second region of the storage device.

2. The method of claim 1, wherein the storage device is a non-volatile storage device, and wherein the parity information is stored in a volatile storage device.

3. The method of claim 1 further comprising identifying the first region that is associated with the second region by determining that, when an error is encountered storing data in the second region, data stored in the first region is subject to errors.

4. The method of claim 1, wherein the parity information is first parity information, further comprising:
    storing a third data block in a third region of the storage device after storing the second data block in the second region, wherein the third data block is associated with second parity information;
    deleting the first parity information from being stored while storage of the first data block is retained in the first region of the storage device; and
    storing the second parity information until another block is successfully stored.

5. The method of claim 4, wherein third parity information associated with the second data block is retained in storage.

6. The method of claim 1, wherein the first region is non-adjacent to the second region.

7. The method of claim 1, wherein the first data block is one page of a plurality of pages of data in a first stripe of data and wherein the second data block is one page of a plurality of pages of data in a second stripe of data.

8. The method of claim 1, wherein the storage device is a flash storage device.

9. The method of claim 1, wherein the parity information is stored on a storage device different from the storage device in which the first block of data is stored.

10. The method of claim 1, wherein each of the first and second regions corresponds to a respective stripe of a plurality of stripes of the storage device in which data is stored, and wherein the parity information is stored in a region of the storage device dedicated to store parity information for some but not all of the plurality of stripes of the storage device.

11. A system for storing data, the system comprising:
a storage device; and
control circuitry configured to:
receive a first data block and parity information associated with the first data block;
store the first, data block in a first region of the storage device; and
store the parity information until a second data block is successfully stored in a second region of the storage device, wherein the first region of the storage device is associated with the second region of the storage device.

12. The system of claim 11, wherein the storage device is a non-volatile storage device, and wherein the parity information is stored in a volatile storage device.

13. The system of claim 11, wherein the control circuitry is further configured to determine that, when an error is encountered storing data in the second region, data stored in the first region is subject to errors.

14. The system of claim 11, wherein the parity information is first parity information, and wherein the control circuitry is further configured to:
store a third data block in a third region of the storage device after storing the second data block in the second region, wherein the third data block is associated with second parity information;
delete the first parity information from being stored while storage of the first data block is retained in the first region of the storage device; and
store the second party information until another block is successfully stored.

15. The system of claim 14, wherein third parity information associated with the second data block is retained in storage.

16. The system of claim 11, wherein the first region is non-adjacent to the second region.

17. The system of claim 11, wherein the first data block is one page of a plurality of pages of data in a first stripe of data, and wherein the second data block is one page of a plurality of pages of data in a second stripe of data.

18. The system of claim 11, wherein the storage device is a flash storage device.

19. The system of claim 11, wherein the parity information is stored on a storage device different from the storage device in which the first block of data is stored.

20. The system of claim 11, wherein each of the first and second regions corresponds to a respective stripe of a plurality of stripes of the storage device in which data is stored, and wherein the parity information is stored in a region of the storage device dedicated to store parity information for some, but not all, of the plurality of stripes of the storage device.

* * * * *